United States Patent
Hashimoto et al.

(10) Patent No.: US 6,939,606 B2
(45) Date of Patent: Sep. 6, 2005

(54) MAGNETIC RECORDING MEDIUM

(75) Inventors: Hiroshi Hashimoto, Kanagawa (JP); Yuichiro Murayama, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/811,987

(22) Filed: Mar. 30, 2004

(65) Prior Publication Data

US 2004/0197603 A1 Oct. 7, 2004

(30) Foreign Application Priority Data

Mar. 31, 2003 (JP) ........................................ 2003-094593

(51) Int. Cl.$^7$ ............................................. G11B 5/733
(52) U.S. Cl. ...................... 428/328; 428/329; 428/330; 428/694 BS; 428/694 BC
(58) Field of Search ................. 428/328, 329, 428/330, 694 BS, 694 BC

(56) References Cited

U.S. PATENT DOCUMENTS

| | | | | |
|---|---|---|---|---|
| 4,619,856 A | * | 10/1986 | Kamada et al. | 428/143 |
| 4,746,558 A | * | 5/1988 | Shimozawa et al. | 428/141 |
| 5,639,546 A | * | 6/1997 | Bilkadi | 428/331 |
| 6,074,724 A | * | 6/2000 | Inaba et al. | 428/141 |
| 6,162,842 A | * | 12/2000 | Freche et al. | 522/120 |

FOREIGN PATENT DOCUMENTS

| | | |
|---|---|---|
| JP | 60-133529 A | 7/1985 |
| JP | 60-133530 A | 7/1985 |
| JP | 60-133531 A | 7/1985 |
| JP | 5-57647 B2 | 8/1993 |
| JP | 2002-133637 A | 5/2002 |

* cited by examiner

Primary Examiner—Stevan A. Resan
(74) Attorney, Agent, or Firm—Sughrue Mion, PLLC

(57) ABSTRACT

A magnetic recording medium is provided that includes, in order, (1) a non-magnetic support, a radiation-cured layer formed by applying a layer containing a radiation curing compound and curing by exposure to radiation, and a magnetic layer having a ferromagnetic powder dispersed in a binder, or (2) a non-magnetic support, a radiation-cured layer formed by applying a layer containing a radiation curing compound and curing by exposure to radiation, a non-magnetic layer having a non-magnetic powder dispersed in a binder, and a magnetic layer having a ferromagnetic powder dispersed in a binder; the radiation-cured layer including 0.3 to 30 parts by weight of an inorganic powder relative to 100 parts by weight the radiation curing compound.

13 Claims, No Drawings

MAGNETIC RECORDING MEDIUM

BACKGROUND OF THE INVENTION

1. Field of the Invention

The present invention relates to a magnetic recording medium having at least one magnetic layer provided over a non-magnetic support.

2. Description of the Related Art

As tape-form magnetic recording media for audio, video, and computers, and disc-form magnetic recording media such as flexible discs, a magnetic recording medium has been used in which a magnetic layer having dispersed in a binder a ferromagnetic powder such as γ-iron oxide, Co-containing iron oxide, chromium oxide, or a ferromagnetic metal powder is provided on a support. With regard to the support used in the magnetic recording medium, polyethylene terephthalate, polyethylene naphthalate, etc. are generally used. Since these supports are drawn and are highly crystallized, their mechanical strength is high and their solvent resistance is excellent.

Since the magnetic layer, which is obtained by coating the support with a coating solution having the ferromagnetic powder dispersed in the binder, has a high degree of packing of the ferromagnetic powder, low elongation at break and is brittle, it is easily destroyed by the application of mechanical force and might peel off from the support. In order to prevent this, an undercoat layer is provided on the support so as to make the magnetic layer adhere strongly to the support.

On the other hand, magnetic recording media are known in which a radiation-cured layer is formed using a compound having a functional group that is cured by radiation such as an electron beam, that is, a radiation curing compound (ref. JP-B-5-57647, JP-A-60-133529, JP-A-60-133530, and JP-A-60-133531; JP-B denotes a Japanese examined patent application publication, and JP-A denotes a Japanese unexamined patent application publication). These radiation-cured layers formed from the radiation curing compound have poor adhesion to the magnetic layer, and when such a magnetic recording medium, for example, a video tape, is run repeatedly in a VTR, a part of the magnetic layer peels off, thus giving rise to the problem of faults such as dropouts. Furthermore, when coating the radiation-cured layer with a magnetic layer, since the surface of the radiation-cured layer is smooth it easily sticks to web handling rollers, and this might cause faults due to the occurrence of creases.

Recently, a playback head employing MR (magnetoresistance) as the operating principle has been proposed, its use in hard disks, etc. has started, and its application to magnetic tape has been proposed. The MR head gives a playback output several times that of an induction type magnetic head; since it does not use an induction coil, equipment noise such as impedance noise is greatly reduced, and by reducing the noise of the magnetic recording medium it becomes possible to obtain a large S/N ratio. In other words, by reducing the magnetic recording medium noise, which had previously been hidden by equipment noise, recording and playback can be carried out well, and the high density recording characteristics are outstandingly improved.

However, the MR head has the problem that it generates noise (thermal noise) under the influence of microscopic heating; in particular, it has the problem that when it hits a projection present on the surface of a magnetic layer, the noise suddenly increases and continues, and in the case of digital recording the problem can be so serious that error correction is impossible. This problem of thermal noise becomes serious in a magnetic recording medium used in a system in which a recorded signal having a recording density of 0.5 Gbit/inch$^2$ or higher is replayed.

In order to reduce such thermal noise, it is important to control the surface properties of the magnetic layer, and there has been a desire for suitable means to do this.

In order to improve the smoothness and the transport durability of the magnetic recording medium, a magnetic recording medium has therefore been proposed that contains, in a magnetic layer or a middle layer, a radiation-curing polyfunctional curing agent and, as a binder, a polyurethane in which a magnetic powder and a non-magnetic powder have high dispersibility (ref. JP-A-2002-133637). However, it is necessary for the surface of a support that is used for this magnetic recording medium to be extremely smooth, and the friction of the support during a coating step is therefore high and the support sticks, thus readily causing faults due to the occurrence of creases and thereby degrading the productivity.

BRIEF SUMMARY OF THE INVENTION

An object of the present invention is to provide a magnetic recording medium that has excellent smoothness and electromagnetic conversion characteristics, has few faults when transporting a web during a production process and little loss of the magnetic layer, and has excellent productivity.

The object of the present invention has been achieved by the following means.

(1) A magnetic recording medium comprising, in order: (A) a non-magnetic support, a radiation-cured layer formed by applying a layer containing a radiation curing compound and curing by exposure to radiation, and a magnetic layer having a ferromagnetic powder dispersed in a binder, or (B) a non-magnetic support, a radiation-cured layer formed by applying a layer containing a radiation curing compound and curing by exposure to radiation, a non-magnetic layer having a non-magnetic powder dispersed in a binder, and a magnetic layer having a ferromagnetic powder dispersed in a binder; the radiation-cured layer including 0.3 to 30 parts by weight of an inorganic powder relative to 100 parts by weight of the radiation curing compound.

DETAILED DESCRIPTION OF THE INVENTION

Preferred embodiments of the above-mentioned invention (1) are listed below.

(2) The magnetic recording medium according to (1), wherein it is the magnetic recording medium described in (B), (3) the magnetic recording medium according to (1), wherein the inorganic powder is selected from the group consisting of a metal oxide, a metal carbonate, a metal sulfate, a metal nitride, a metal carbide, a metal silicide, and a metal sulfide, (4) the magnetic recording medium according to (1), wherein the inorganic powder is selected from the group consisting of α-alumina with an a component proportion of at least 90%, α-alumina, γ-alumina, θ-alumina, silicon carbide, chromium oxide, cerium oxide, α-iron oxide, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide, (5) the magnetic recording medium according to (1), wherein the inorganic powder is selected from the group consisting of titanium dioxide, zinc oxide, iron oxide, and barium sulfate, (6) the magnetic recording medium according to (1), wherein the inorganic powder is selected from the group consisting of titanium dioxide and α-iron oxide, (7) the magnetic recording medium according to (2), wherein the inorganic powder has the same composition as that of the non-magnetic powder, (8) the magnetic recording medium according to (1), wherein the radiation is an electron beam or ultraviolet rays, (9) the magnetic recording medium according to (1), wherein the radiation is an electron beam,

(10) the magnetic recording medium according to (1), wherein the radiation curing compound is a difunctional acrylate compound or a difunctional methacrylate compound,

(11) the magnetic recording medium according to (1), wherein the ferromagnetic powder is a ferromagnetic metal powder,

(12) the magnetic recording medium according to (1), wherein the ferromagnetic powder is a ferromagnetic hexagonal ferrite powder,

(13) the magnetic recording medium according to (1), wherein the radiation curing compound has a viscosity at 25° C. of 10 to 1,000 mPa·sec,

(14) the magnetic recording medium according to (1), wherein the non-magnetic support has a thickness of 10 μm or less, and

(15) the magnetic recording medium according to (1), wherein the radiation-cured layer includes at least 0.3 parts by weight and less than 5 parts by weight of the inorganic powder relative to 100 parts by weight of the radiation curing compound.

The present invention is explained in detail below.

I. Radiation-cured Layer

The radiation-cured layer of the present invention includes a radiation curing compound and an inorganic powder. The inorganic powder is contained at at least 0.3 parts by weight and at most 30 parts by weight relative to 100 parts by weight of the radiation curing compound, preferably at least 0.3 parts by weight and at most 10 parts by weight, and more preferably at least 0.3 parts by weight and less than 5 parts by weight.

If the amount of inorganic powder exceeds 30 parts by weight, the surface of the radiation-cured layer becomes rough, which is undesirable. If it is less than 0.3 parts by weight, then after exposure to radiation, the web easily sticks to a roller during the process of coating the radiation-cured layer with a non-magnetic layer or a magnetic layer, thus causing problems, which is undesirable.

Furthermore, in order to disperse the inorganic powder, a known dispersant or surface treatment agent can be added. In this case, it is preferable to disperse the inorganic powder in a solvent with the dispersant or the surface treatment agent before mixing and dispersing the radiation curing compound. If the inorganic powder is subjected to the dispersion treatment in the presence of the radiation curing compound, there is a possibility that the radiation curing compound might polymerize during the dispersion step, which is undesirable.

<Radiation Curing Compound>

The 'radiation curing compound' contained in the radiation-cured layer in the present invention means a compound that has the property of starting to polymerize or crosslink on exposure to radiation such as ultraviolet rays or an electron beam and curing to become a macromolecule. The radiation curing compound does not react unless external energy (ultraviolet rays, an electron beam, etc.) is applied thereto. Because of this, a coating solution containing the radiation curing compound has stable viscosity as long as no radiation is applied, and high coating smoothness can be obtained. Moreover, since reaction proceeds instantaneously by virtue of the high energy of the ultraviolet rays or the electron beam, a coating solution containing the radiation curing compound can give high coating strength.

The radiation used in the present invention includes various type of radiation such as an electron beam (β-rays), ultraviolet rays, X-rays, γ-rays, and α-rays.

Examples of the radiation curing compound used in the radiation-cured layer of the present invention include radiation-sensitive double bond-containing compounds such as acrylate esters, acrylamides, methacrylate esters, methacrylamides, allyl compounds, vinyl ethers, and vinyl esters.

Examples of difunctional radiation curing compounds include those formed by adding acrylic acid or methacrylic acid to an aliphatic diol; for example, ethylene glycol diacrylate, propylene glycol diacrylate, butanediol diacrylate, hexanediol diacrylate, tetraethylene glycol diacrylate, neopentyl glycol diacrylate, ethylene glycol dimethacrylate, propylene glycol dimethacrylate, butanediol dimethacrylate, hexanediol dimethacrylate, neopentyl glycol dimethacrylate; acrylate compounds or methacrylate compounds of alicyclic diols such as cyclohexanediol diacrylate, cyclohexanediol dimethacrylate, cyclohexane dimethanol diacrylate, cyclohexane dimethanol dimethacrylate, hydrogenated bisphenol A diacrylate, hydrogenated bisphenol A dimethacrylate, hydrogenated bisphenol F diacrylate, hydrogenated bisphenol F dimethacrylate, tricyclodecane dimethanol diacrylate, and tricyclodecane dimethanol dimethacrylate.

There can also be cited polyether acrylates and polyether methacrylates formed by adding acrylic acid or methacrylic acid to a polyether polyol such as polyethylene glycol, polypropylene glycol, or polytetramethylene glycol; for example, diethylene glycol diacrylate, triethylene glycol diacrylate, dipropylene glycol diacrylate, tripropylene glycol diacrylate, diethylene glycol dimethacrylate, triethylene glycol dimethacrylate, tetraethylene glycol dimethacrylate, dipropylene glycol dimethacrylate, and tripropylene glycol dimethacrylate.

It is also possible to use a polyester acrylate or a polyester methacrylate in which acrylic acid or methacrylic acid is added to a polyester polyol obtained from a known dibasic acid and a known glycol.

It is also possible to use a polyurethane acrylate or a polyurethane methacrylate in which acrylic acid or methacrylic acid is added to a polyurethane obtained by reacting a known polyol or diol with a polyisocyanate.

It is also possible to use those obtained by adding acrylic acid or methacrylic acid to bisphenol A, bisphenol F, hydrogenated bisphenol A, hydrogenated bisphenol F, or an alkylene oxide adduct thereof; an isocyanuric acid alkylene oxide-modified diacrylate, an isocyanuric acid alkylene oxide-modified dimethacrylate, etc.

As trifunctional compounds there can be used trimethylolpropane triacrylate, trimethylolethane triacrylate, an alkylene oxide-modified triacrylate of trimethylolpropane, pentaerythritol triacrylate, dipentaerythritol triacrylate, an isocyanuric acid alkylene oxide-modified triacrylate, propionic acid dipentaerythritol triacrylate, a hydroxypivalaldehyde-modified dimethylolpropane triacrylate, trimethylolpropane trimethacrylate, an alkylene oxide-modified trimethylolpropane trimethacrylate, pentaerythritol trimethacrylate, dipentaerythritol trimethacrylate, an isocyanuric acid alkylene oxide-modified trimethacrylate, propionic acid dipentaerythritol trimethacrylate, a hydroxypivalaldehyde-modified dimethylolpropane trimethacrylate, etc.

As tetra- or higher-functional radiation curing compounds there can be used pentaerythritol tetraacrylate, ditrimethylolpropane tetraacrylate, dipentaerythritol pentaacrylate, propionic acid dipentaerythritol tetraacrylate, dipentaerythritol hexaacrylate, an alkylene oxide-modified hexaacrylate of phosphazene, etc.

These compounds can be used singly or in a combination of two or more types.

Among these, difunctional acrylate compounds and methacrylate compounds are preferable, and specific examples of the compounds include diethylene glycol diacrylate, triethylene glycol diacrylate, dipropylene glycol diacrylate, tripropylene glycol diacrylate, hydrogenated bisphenol A diacrylate, hydrogenated bisphenol A dimethacrylate, tricyclodecanedimethanol diacrylate, and tricyclodecanedimethanol dimethacrylate. When there are too many functional groups or the concentration of functional groups is too high, curing shrinkage is large, and adhesion to the non-magnetic support tends to deteriorate, which is undesirable.

In the radiation curing compound, a known monofunctional acrylate or methacrylate compound described in 'Teienerugi Denshisenshosha no Oyogijutsu' (Applied Technology of Low-energy Electron Beam Irradiation) (2000, Published by CMC), 'UV.EB Kokagijutsu' (UV.EB Curing Technology) (1982, Published by Sogo Gijutsu Center), etc. may be used in combination as a reactive diluent.

With regard to the compound used in combination, an acrylate compound having an alicyclic hydrocarbon skeleton is preferable. Specific examples include cyclohexyl (meth)acrylate, isobornyl (meth)acrylate, and tetrahydrofurfuryl (meth)acrylate.

The amount of reactive diluent added is preferably 10 to 90 wt % of the above-mentioned di- or higher-functional compound.

The molecular weight of the radiation curing compound is preferably 2,000 or less, which is a relatively low molecular weight, and more preferably 1,000 or less. The lower the molecular weight, the lower the viscosity and the higher the leveling, thus improving the smoothness.

The viscosity of the radiation curing compound is preferably 10 to 1,000 mPa·sec at 25° C., and more preferably 10 to 800 mPa·sec.

The radiation used in the present invention may be an electron beam or ultraviolet rays. When ultraviolet rays are used, it is necessary to add a photopolymerization initiator to the radiation curing compound. In the case of curing with an electron beam, no polymerization initiator is required, and the electron beam has a deep penetration depth, which is preferable.

With regard to electron beam accelerators that can be used here, there are a scanning system, a double scanning system, and a curtain beam system, and the curtain beam system is preferable since it is relatively inexpensive and gives a high output. With regard to electron beam characteristics, the acceleration voltage is preferably 30 to 1,000 kV, and more preferably 50 to 300 kV. The absorbed dose is preferably 0.5 to 20 Mrad, and more preferably 0.5 to 10 Mrad. When the acceleration voltage is in the above-mentioned range, the amount of energy penetrating is sufficient, and the efficiency of energy usage in polymerization is high, which is economical. The electron beam irradiation atmosphere is preferably controlled by a nitrogen purge so that the concentration of oxygen is 200 ppm or less. When the concentration of oxygen is 200 ppm or less, crosslinking and curing reactions in the vicinity of the surface are not inhibited.

As a light source for the ultraviolet rays, a mercury lamp is preferably used. The mercury lamp is a 20 to 240 W/cm lamp and is preferably used at a speed of 0.3 to 20 m/min. The distance between a substrate and the mercury lamp is generally preferably 1 to 30 cm.

As the photopolymerization initiator used for ultraviolet curing, a radical photopolymerization initiator is used. More particularly, those described in, for example, 'Shinkobunshi Jikkenngaku'(New Polymer Experiments), Vol. 2, Chapter 6 Photo/Radiation Polymerization (Published by Kyoritsu Publishing, 1995, Ed. by the Society of Polymer Science, Japan) can be used. Specific examples thereof include acetophenone, benzophenone, anthraquinone, benzoin ethyl ether, benzil methyl ketal, benzil ethyl ketal, benzoin isobutyl ketone, hydroxydimethyl phenyl ketone, 1-hydroxycyclohexyl phenyl ketone, and 2,2-diethoxyacetophenone. The mixing ratio of the aromatic ketone is preferably 0.5 to 20 parts by weight relative to 100 parts by weight of the radiation curing compound, more preferably 2 to 15 parts by weight, and yet more preferably 3 to 10 parts by weight.

<Inorganic Powder>

The inorganic powder added to the radiation-cured layer is explained below.

The inorganic powder can be chosen from inorganic compounds such as a metal oxide, a metal carbonate, a metal sulfate, a metal nitride, a metal carbide, a metal silicide, and a metal sulfide, and it is preferable to use the same composition as that of an inorganic powder used in a non-magnetic layer provided thereon by coating. For example, α-alumina with an a component proportion of at least 90%, β-alumina, γ-alumina, θ-alumina, silicon carbide, chromium oxide, cerium oxide, α-iron oxide, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, etc. can be used singly or in combination. From the viewpoint of a narrow particle size distribution, the possibility of having many means for imparting functionality, etc., titanium dioxide, zinc oxide, iron oxide and barium sulfate are preferable, and titanium dioxide and α-iron oxide are more preferable.

The particle size of such an inorganic powder is preferably 0.005 to 2 μm, but it is also possible, as necessary, to combine inorganic powders having different particle sizes or widen the particle size distribution of a single inorganic powder, thus producing the same effect. The particle size of the inorganic powder is particularly preferably 0.01 to 0.2 μm. In particular, when the inorganic powder is a granular metal oxide, the average particle size is preferably 0.08 μm or less. When it is an acicular metal oxide, the major axis length is preferably 0.3 μm or less, and more preferably 0.1 μm or less. The tap density is 0.05 to 2 g/ml, and preferably 0.2 to 1.5 g/ml.

The water content of the inorganic powder is preferably 0.1 to 5 wt %, more preferably 0.2 to 3 wt %, and particularly preferably 0.3 to 1.5 wt %. The pH of the inorganic powder is preferably 2 to 11, and particularly preferably in the range of 5.5 to 10. The specific surface area ($S_{BET}$) of the inorganic powder by the BET method is preferably 1 to 100 m$^2$/g, more preferably 5 to 80 m$^2$/g, and yet more preferably 10 to 70 m$^2$/g. The crystallite size is preferably 0.004 to 1 μm, and more preferably 0.04 to 0.1 μm. The oil absorption measured using DBP (dibutyl phthalate) is 5 to 100 ml/100 g, preferably 10 to 80 ml/100 g, and more preferably 20 to 60 ml/100 g. The specific gravity is 1 to 12, and preferably 3 to 6. The form may be any one of acicular, spherical, polyhedral, and tabular.

The ignition loss is preferably 20 wt % or less, and it is most preferable that there is no ignition loss. The Mohs hardness of the inorganic powder used in the present invention is preferably in the range of 4 to 10. The roughness factor of the surface of the powder is preferably 0.8 to 1.5, and more preferably 0.9 to 1.2. The amount of SA (stearic acid) absorbed by the inorganic powder is preferably 1 to 20 μmol/m$^2$, more preferably 2 to 15 μmol/m$^2$, and yet more preferably 3 to 8 μmol/m$^2$. The heat of wetting of the inorganic powder in water at 25° C. is preferably in the range of 200 to 600 erg/cm$^2$. It is preferable to use a solvent that gives a heat of wetting in this range, and the pH is preferably between 3 and 6.

The surface of the inorganic powder is preferably subjected to a surface treatment so that $Al_2O_3$, $SiO_2$, $TiO_2$, $ZrO_2$, $SnO_2$, $Sb_2O_3$, ZnO, or $Y_2O_3$ is present. In terms of dispersibility in particular, $Al_2O_3$, $SiO_2$, $TiO_2$, and $ZrO_2$ are preferable, and $Al_2O_3$, $SiO_2$, and $ZrO_2$ are more preferable. They may be used in combination or singly. Depending on the intended purpose, a surface-treated layer may be obtained by co-precipitation, or a method in which it is firstly treated with alumina and the surface thereof is then treated with silica, or vice versa, can be employed. The surface-treated layer may be formed as a porous layer depending on the intended purpose, but it is generally preferable for it to be uniform and dense.

Specific examples include Nanotite (manufactured by Showa Denko K.K.), HIT-100 and ZA-G1 (manufactured by Sumitomo Chemical Co., Ltd.), α-hematite DPN-250, DPN-250BX, DPN-245, DPN-270BX, DBN-SA1, and DBN-SA3 (manufactured by Toda Kogyo Corp.), titanium oxide TTO-51 B, TTO-55A, TTO-55B, TTO-55C, TTO-55S, TTO-55D, SN-100, α-hematite E270, E271, E300, and E303 (manufactured by Ishihara Sangyo Kaisha Ltd.), titanium oxide STT4D, STT-30D, STT-30, STT-65C, and α-hematite α-40 (manufactured by Titan Kogyo Kabushiki Kaisha), MT-100S, MT-100T, MT-150W, MT-500B, MT-600B, MT-100F, and MT-500HD (manufactured by Tayca Corporation), FINEX-25, BF-1, BF-10, BF-20, and ST-M (manufactured by Sakai Chemical Industry Co., Ltd.), DEFIC-Y and DEFIC-R (manufactured by Dowa Mining Co., Ltd.), AS2BM and TiO2P25 (manufactured by Nippon Aerosil Co., Ltd.), and 100A, 500A and calcined products thereof (manufactured by Ube Industries, Ltd.).

Particularly preferred inorganic powders are titanium dioxide and α-iron oxide. α-Iron oxide (hematite) is employed under the various conditions below. That is, with regard to the α-$Fe_2O_3$ powder used in the present invention, its precursor particles are acicular goethite particles obtained by, for example, a normal method (1) for forming acicular goethite particles in which a ferrous hydroxide colloid-containing suspension obtained by adding at least an equivalent amount of an aqueous solution of an alkali hydroxide to an aqueous ferrous solution is subjected to an oxidation reaction at a pH of 11 or higher at a temperature of 80° C. or less while passing an oxygen-containing gas therethrough, a method (2) for forming spindle-shaped goethite particles in which an oxidation reaction is carried out by passing an oxygen-containing gas into a suspension containing $FeCO_3$ obtained by reacting an aqueous solution of a ferrous salt and an aqueous solution of an alkali carbonate, a method (3) for forming acicular goethite nuclei particles by carrying out an oxidation reaction by passing an oxygen-containing gas into an aqueous solution of a ferrous salt containing a ferrous hydroxide colloid obtained by adding less than an equivalent amount of an aqueous solution of an alkali hydroxide or an alkali carbonate to an aqueous solution of a ferrous salt, and subsequently growing the acicular goethite nuclei particles by adding an aqueous solution of an alkali hydroxide to the aqueous solution of the ferrous salt containing the acicular goethite nuclei particles in an amount that is at least equivalent to the $Fe^{2+}$ in the aqueous solution of the ferrous salt, and then passing through an oxygen-containing gas, and a method (4) for forming acicular goethite nuclei particles by carrying out an oxidation reaction by passing an oxygen-containing gas into an aqueous solution of a ferrous salt containing a ferrous hydroxide colloid obtained by adding less than an equivalent amount of an aqueous solution of an alkali hydroxide or an alkali carbonate to an aqueous ferrous solution, and subsequently growing the acicular goethite nuclei particles in an acidic to neutral region.

During the reaction to form goethite particles, different types of elements such as Ni, Zn, P, and Si, which are normally added in order to improve the characteristics of the powder, etc., may be added without any problem. The acicular goethite particles, which are the precursor particles, are dehydrated at a temperature in the range of 200 to 500° C., and if necessary further annealed by heating at a temperature in the range of 350 to 800° C. to give acicular α-$Fe_2O_3$ particles. An anti-sintering agent such as P, Si, B, Zr, or Sb can be attached without problem to the surface of the acicular goethite particles that are to be dehydrated or annealed. Annealing by heating at a temperature in the range of 350 to 800° C. is carried out for blocking pores formed on the surface of the dehydrated acicular α-$Fe_2O_3$ particles by melting the very surface of the particles, thus giving a smooth surface configuration, which is preferable.

The α-$Fe_2O_3$ powder used in the present invention is obtained by subjecting the dehydrated or annealed acicular α-$Fe_2O_3$ particles to dispersion in an aqueous solution to give a suspension, coating the surface of the α-$Fe_2O_3$ particles with an Al compound by adding the compound and adjusting the pH, and further subjecting the particles to filtration, washing with water, drying, grinding, and if necessary further degassing/compacting, etc. As the Al compound, an aluminum salt such as aluminum acetate, aluminum sulfate, aluminum chloride, or aluminum nitrate or an alkali aluminate such as sodium aluminate can be used. In this case, the amount of Al compound added on an Al basis is preferably 0.01 to 50 wt % relative to the α-$Fe_2O_3$ powder. When the amount of Al compound added is in the above-mentioned range, the dispersibility thereof in a binder resin is good, and the Al compounds suspended on the particle surface do not interact, which is preferable.

With regard to the inorganic powder used in the radiation-cured layer, the coating can be carried out using, in addition to the Al compound, one or two or more types of compounds chosen from an Si compound, and P, Ti, Mn, Ni, Zn, Zr, Sn, and Sb compounds. The amount of such a compound used together with the Al compound is preferably in the range of 0.01 to 50 wt % relative to the α-$Fe_2O_3$ powder. When the amount added is in the above-mentioned range, the effect of improving the dispersibility by the addition is good, and the suspended compounds that are not on the particle surface do not interact, which is preferable.

Methods for producing titanium dioxide are as follows. The main methods for producing titanium oxide are a sulfuric acid method and a chlorine method. In the sulfuric acid method, an ilmenite ore is digested with sulfuric acid, and Ti, Fe, etc. are extracted as sulfates. Iron sulfate is removed by crystallization, the remaining titanyl sulfate solution is purified by filtration and then subjected to thermal hydrolysis so as to precipitate hydrated titanium oxide. After this is filtered and washed, impurities are removed by washing, a particle size regulator, etc. is added thereto, and the mixture is calcined at 80 to 1,000° C. to give crude titanium oxide. The rutile type and the anatase type can be separated according to the type of a nucleating agent that is added when carrying out hydrolysis. This crude titanium oxide is subjected to grinding, size adjustment, surface treatment, etc. As an ore for the chlorine method, natural rutile or synthetic rutile is used. The ore is chlorinated at high temperature under reducing conditions, Ti is converted into $TiCl_4$ and Fe is converted into $FeCl_2$, and iron oxide solidifies by cooling and is separated from liquid $TiCl_4$. The crude $TiCl_4$ thus obtained is purified by distillation, then a nucleating agent is added, and the mixture is reacted momentarily with oxygen at a temperature of 1,000° C. or higher to give crude titanium oxide. A finishing method for imparting pigmentary properties to the crude titanium oxide formed by this oxidative decomposition process is the same as that for the sulfuric acid method.

The surface treatment is carried out by dry-grinding the above-mentioned titanium oxide material, then adding water and a dispersant thereto, and subjecting it to rough classification by wet-grinding and centrifugation. Subsequently, the fine grain slurry is transferred to a surface treatment vessel, and here surface coating with a metal hydroxide is carried out. Firstly, a predetermined amount of an aqueous solution of a salt such as Al, Si, Ti, Zr, Sb, Sn, or Zn is added, an acid or an alkali for neutralizing this is added, and the hydrated oxide thus formed is used for coating the surface of the titanium oxide particles. Water-soluble salts produced as a by-product are removed by decantation, filtration, and washing. Finally the pH of the slurry is adjusted, and it is filtered and washed with pure water. The cake thus washed is dried by a spray dryer or a band dryer. This dried product is ground using a jet mill to give a final product.

In addition to the an aqueous system, it is also possible to expose a titanium oxide powder to $AlCl_3$ or $SiCl_4$ vapor and then to steam, thereby carrying out a surface treatment with Al or Si. Other methods for preparing a pigment can be referred to in G. D. Parfift and K. S. W. Sing, "Characterization of Powder Surfaces" Academic Press, 1976.

It is possible to add carbon black to the radiation-cured layer used in the present invention. Incorporation of carbon black can give the known effects of a lowering of surface electrical resistance (Rs), a reduction in light transmittance, and giving a desired micro Vickers hardness. Not adding any carbon black at all is also a preferred embodiment.

Types of carbon black that can be used include furnace black for rubber, thermal black for rubber, black for coloring, and acetylene black. The carbon black used in the radiation-cured layer should have characteristics that have been optimized as follows according to a desired effect, and the effect can be increased by the use thereof in combination.

The specific surface area of the carbon black is preferably 100 to 500 $m^2$/g, and more preferably 150 to 400 $m^2$/g, and the DBP oil absorption thereof is preferably 20 to 400 ml/100 g, and more preferably 30 to 200 ml/100 g. The particle size of the carbon black is preferably 5 to 80 nm, more preferably 10 to 50 nm, and yet more preferably 10 to 40 nm. The pH of the carbon black is preferably 2 to 10, the water content is preferably 0.1 to 10%, and the tap density is preferably 0.1 to 1 g/ml.

Specific examples of the carbon black used in the present invention include BLACKPEARLS 2000, 1300, 1000, 900, 800, 880 and 700, and VULCAN XC-72 (manufactured by Cabot Corporation), #3050B, #3150B, #3250B, #3750B, #3950B, #950, #650B, #970B, #850B, MA-600, MA-230, #4000 and #4010 (manufactured by Mitsubishi Chemical Corporation), CONDUCTEX SC, RAVEN 8800, 8000, 7000, 5750, 5250, 3500, 2100, 2000, 1800, 1500, 1255 and 1250 (manufactured by Columbia Carbon Co.), and Ketjen Black EC (manufactured by Akzo).

The carbon black may be subjected to any of a surface treatment with a dispersant, etc., grafting with a resin, or a partial surface graphitization. The carbon black may also be dispersed in a binder prior to addition to a coating solution. The carbon black can be preferably used in a range not exceeding 50 wt % relative to the above-mentioned inorganic powder. The carbon black can be used alone or in a combination of different types thereof. The carbon black that can be used in the present invention can be referred to in, for example, the 'Kabon Burakku Handobukku' (Carbon Black Handbook) (edited by the Carbon Black Association of Japan).

An additive, solvent, etc. for the inorganic powder can be those described below for the magnetic layer and the non-magnetic layer. In particular, the amounts added and the types of additive and dispersant can be determined according to known technology regarding the magnetic layer.

The glass transition temperature (Tg) of the radiation-cured layer after curing is preferably 80 to 150° C., and more preferably 100 to 130° C. When the glass transition temperature is in the above-mentioned range, the problem of tackiness during a coating step can be suppressed, and good coating strength can be obtained, which is preferable.

The thickness of the radiation-cured layer is preferably 0.1 to 1.0 $\mu$m, and more preferably 0.3 to 0.7 $\mu$m. When it is less than 0.1 $\mu$m, sufficient smoothness cannot be obtained, and when it exceeds 1.0 $\mu$m, it is difficult for the coating to be dried, thus causing the problem of tackiness in some cases.

II. Magnetic Layer

<Ferromagnetic Powder>

The ferromagnetic powder contained in the magnetic layer of the present invention can be either a ferromagnetic metal powder or a ferromagnetic hexagonal ferrite powder.

(Ferromagnetic Metal Powder)

The ferromagnetic metal powder used in the magnetic layer of the present invention is not particularly limited as long as Fe is contained as a main component (including an alloy), and a ferromagnetic alloy powder having α-Fe as a main component is preferable. These ferromagnetic metal powders may contain, apart from the designated atom, atoms such as Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, and B. It is preferable for the powder to contain, in addition to α-Fe, at least one chosen from Al, Si, Ca, Y, Ba, La, Nd, Co, Ni, and B, and particularly preferably Co, Al, and Y. More specifically, the Co content is preferably 10 to 40 atom % relative to Fe, the Al content is preferably 2 to 20 atom %, and the Y content is preferably 1 to 15 atom %.

These ferromagnetic metal powders may be treated in advance, prior to dispersion, with a dispersant, a lubricant, a surfactant, an antistatic agent, etc., which will be described later. The ferromagnetic metal powder may contain a small amount of water, a hydroxide, or an oxide.

The water content of the ferromagnetic metal powder is preferably set at 0.01 to 2%. The water content of the ferromagnetic metal powder is preferably optimized according to the type of binder.

The crystallite size is preferably 8 to 20 nm, more preferably 10 to 18 nm, and yet more preferably 12 to 16 nm. The crystallite size is an average value obtained by the Scherrer method from a half-value width of a diffraction peak obtained using an X-ray diffractometer (RINT2000 manufactured by Rigaku Corporation) with a CuKα1 radiation source, a tube voltage of 50 kV, and a tube current of 300 mA.

The length of the major axis of the ferromagnetic metal powder is preferably 10 to 100 nm, more preferably 30 to 90 nm, and yet more preferably 40 to 80 nm. When the magnetic recording medium of the present invention is played back using a magnetoresistive head (MR head), the length of the major axis of the ferromagnetic metal powder is preferably 60 nm or less. The length of the major axis is determined by the combined use of a method in which a transmission electron microscope photograph is taken and the length of the minor axis and the length of the major axis of the ferromagnetic metal powder are measured directly therefrom, and a method in which a transmission electron microscope photograph is traced by an IBASSI image analyzer (manufactured by Carl Zeiss Inc.) and read off.

The specific surface area ($S_{BET}$) obtained by the BET method of the ferromagnetic metal powder used in the magnetic layer of the present invention is preferably 30 to 100 $m^2/g$, and more preferably 38 to 85 $m^2/g$. This enables both good surface properties and low noise to be achieved at the same time. The pH of the ferromagnetic metal powder is preferably optimized according to the binder used in combination therewith. The pH is preferably in the range of 4 to 12, and more preferably from 7 to 10. The ferromagnetic metal powder may be subjected to a surface treatment with Al, Si, P, or an oxide thereof, if necessary. The amount thereof is preferably 0.1 to 10 wt % relative to the ferromagnetic metal powder. The surface treatment can preferably suppress adsorption of a lubricant such as a fatty acid to 100 $mg/m^2$ or less.

The ferromagnetic metal powder may contain soluble inorganic ions such as Na, Ca, Fe, Ni or Sr ions in some cases, and their presence at 200 ppm or less does not particularly affect the characteristics. Furthermore, the ferromagnetic metal powder used in the magnetic layer of the present invention preferably has few pores, and the level thereof is preferably 20 vol % or less, and more preferably 5 vol % or less. The form of the ferromagnetic metal powder may be any of acicular, granular, rice-grain shaped, and tabular as long as the above-mentioned requirements for the particle size are satisfied, but it is particularly preferable to use an acicular ferromagnetic metal powder. In the case of the acicular ferromagnetic metal powder, the acicular ratio is preferably 4 to 12, and more preferably 5 to 12.

The coercive force (Hc) of the ferromagnetic metal powder is preferably 143 to 239 kA/m (1,800 to 3,000 Oe), and more preferably 151 to 231 kA/m (1,900 to 2,900 Oe). The saturation magnetic flux density is preferably 150 to 300 mT (1,500 to 3,000 G), and more preferably 160 to 290 mT (1,600 to 2,900 G). The saturation magnetization (σs) is preferably 140 to 170 $A·m^2/kg$ (emu/g), and more preferably 145 to 160 $A·m^2/kg$ (emu/g).

The SFD (switching field distribution) of the magnetic substance itself is preferably low, and 0.8 or less is preferred.

When the SFD is 0.8 or less, the electromagnetic conversion characteristics become good, the output becomes high, the magnetization reversal becomes sharp with a small peak shift, and it is suitable for high-recording-density digital magnetic recording. In order to narrow the Hc distribution, there is a technique of improving the particle distribution of goethite, a technique of using monodispersed $\alpha$-$Fe_2O_3$, and a technique of preventing sintering between particles, etc. in the ferromagnetic metal powder.

The ferromagnetic metal powder can be obtained by a known production method and the following methods can be cited. There are a method in which hydrated iron oxide or iron oxide, on which a sintering prevention treatment has been carried out, is reduced with a reducing gas such as hydrogen to give Fe or Fe—Co particles, a method involving reduction with a composite organic acid salt (mainly an oxalate) and a reducing gas such as hydrogen, a method involving thermolysis of a metal carbonyl compound, a method involving reduction by the addition of a reducing agent such as sodium borohydride, a hypophosphite, or hydrazine to an aqueous solution of a ferromagnetic metal, a method in which a fine powder is obtained by vaporizing a metal in an inert gas at low pressure, etc. The ferromagnetic metal powder thus obtained can be subjected to a known slow oxidation process. A method in which hydrated iron oxide or iron oxide is reduced with a reducing gas such as hydrogen, and an oxide film is formed on the surface thereof by controlling the time and the partial pressure and temperature of an oxygen-containing gas and an inert gas is preferable since there is little loss of magnetization.

(Ferromagnetic Hexagonal Ferrite Powder)

Examples of the hexagonal ferrite powder contained in the magnetic layer of the present invention include substitution products of barium ferrite, strontium ferrite, lead ferrite, and calcium ferrite, and Co substitution products. More specifically, magnetoplumbite type barium ferrite and strontium ferrite, magnetoplumbite type ferrite with a particle surface coated with a spinel, magnetoplumbite type barium ferrite and strontium ferrite partially containing a spinel phase, etc., can be cited. It may contain, in addition to the designated atoms, an atom such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, Nb, or Zr. In general, those to which Co—Zn, Co—Ti, Co—Ti—Zr, Co—Ti—Zn, Ni—Ti—Zn, Nb—Zn—Co, Sb—Zn—Co, Nb—Zn, etc. have been added can be used. Characteristic impurities may be included depending on the starting material and the production process.

The average plate size of the ferromagnetic hexagonal ferrite powder is preferably in the range of 5 to 40 nm, more preferably 20 to 35 nm, and yet more preferably 20 to 30 nm. When a magnetoresistive head (MR head) is used for playback in order to increase the track density, the plate size is preferably 40 nm or smaller so as to reduce noise. If the average plate size is 5 nm or more, stable magnetization can be expected without the influence of thermal fluctuations.

The tabular ratio (plate size/plate thickness) of the ferromagnetic hexagonal ferrite powder is preferably 1 to 15, and more preferably 1 to 7. If the tabular ratio is small, high packing in the magnetic layer can be obtained, which is preferable, but if it is too small, sufficient orientation cannot be achieved, and it is therefore preferably at least 1. Furthermore, when the tabular ratio is 15 or less, the noise can be suppressed by inter-particle stacking. The specific surface area ($S_{BET}$) by the BET method of a powder having a particle size within this range is 10 to 200 $m^2/g$. The specific surface area substantially coincides with the value obtained by calculation using the plate size and the plate thickness. The plate size and plate thickness distributions are generally preferably as narrow as possible. Although it is difficult, the distribution can be expressed using a numerical value by randomly measuring 500 particles on a TEM photograph of the particles. The distribution is not a regular distribution in many cases, but the standard deviation calculated with respect to the average size is preferably σ/average size=0.1 to 2.0. In order to narrow the particle size distribution, the reaction system used for forming the particles is made as homogeneous as possible, and the particles so formed are subjected to a distribution-improving treatment. For example, a method of selectively dissolving ultrafine particles in an acid solution is also known.

The coercive force (Hc) measured for the ferromagnetic hexagonal ferrite powder can be adjusted so as to be on the order of 39.8 to 398 kA/m (500 to 5,000 Oe). A higher coercive force (Hc) is advantageous for high-density recording, but it is restricted by the capacity of the recording head. The coercive force (Hc) in the present invention is preferably on the order of 159 to 239 kA/m (2,000 to 3,000 Oe), and more preferably 175 to 223 kA/m (2,200 to 2,800 Oe). When the saturation magnetization of the head exceeds 1.4 T, it is preferably 159 kA/m (2,000 Oe) or higher. The coercive force (Hc) can be controlled by the particle size (plate size, plate thickness), the types and the amount of element included, the element substitution sites, the conditions used for the particle formation reaction, etc. The saturation magnetization (σs) is preferably 40 to 80 A·m$^2$/kg (40 to 80 emu/g). A higher saturation magnetization (σs) is preferable, but there is a tendency for it to become lower when the particles become finer. In order to improve the saturation magnetization (σs), making a composite of magnetoplumbite ferrite with spinel ferrite, selecting the types of element included and their amount, etc., are well known. It is also possible to use a W type hexagonal ferrite in the magnetic layer of the present invention.

When dispersing the ferromagnetic hexagonal ferrite powder, the surface of the magnetic particles can be treated with a material that is compatible with a dispersing medium and a polymer. With regard to a surface-treatment agent, an inorganic or organic compound can be used. Representative examples include compounds of Si, Al, P, etc., and various types of silane coupling agents and various types of titanate coupling agents. The amount thereof added is preferably 0.1 to 10% relative to the magnetic substance. The pH of the magnetic substance is also important for dispersion. It is usually on the order of 4 to 12, and although the optimum value depends on the dispersing medium and the polymer, it is selected from on the order of 6 to 11 from the viewpoints of chemical stability and storage properties of the medium. The moisture contained in the magnetic substance also influences the dispersion. Although the optimum value depends on the dispersing medium and the polymer, it is usually preferably 0.01 to 2.0%.

With regard to the production method for ferromagnetic hexagonal ferrite powder, there is glass crystallization method (1) in which barium oxide, iron oxide, a metal oxide that replaces iron, and boron oxide, etc. as a glass forming material are mixed so as to give a desired ferrite composition, then melted and rapidly cooled to give an amorphous substance, subsequently reheated, then washed, and ground to give a barium ferrite crystal powder; hydrothermal reaction method (2) in which a barium ferrite composition metal salt solution is neutralized with an alkali, and after a by-product is removed, it is heated in a liquid phase at 100° C. or higher, then washed, dried and ground to give a barium ferrite crystal powder; co-precipitation method (3) in which a barium ferrite composition metal salt solution is neutralized with an alkali, and after a by-product is removed, it is dried and treated at 1100° C. or less, and ground to give a barium ferrite crystal powder, etc., but the production method for ferromagnetic hexagonal ferrite powder of the present invention is not particularly limited and any production method can be used. The ferromagnetic hexagonal ferrite powder can be subjected if necessary to a surface treatment with Al, Si, P, an oxide thereof, etc. The amount thereof is preferably 0.1 to 10% based on the ferromagnetic hexagonal ferrite powder, and the surface treatment can reduce the adsorption of a lubricant such as a fatty acid to 100 mg/m$^2$ or less, which is preferable. The ferromagnetic hexagonal ferrite powder may contain soluble inorganic ions such as Na, Ca, Fe, Ni or Sr ions in some cases. It is preferable for the soluble inorganic ions to be substantially absent, but their presence at 200 ppm or less does not particularly affect the characteristics.

<Binder>

Examples of a binder used in the magnetic layer include a polyurethane resin, a polyester resin, a polyamide resin, a vinyl chloride resin, an acrylic resin obtained by copolymerization of styrene, acrylonitrile, methyl methacrylate, etc., a cellulose resin such as nitrocellulose, an epoxy resin, a phenoxy resin, and a polyvinyl acetal resin such as polyvinyl acetal or polyvinyl butyral, and they can be used singly or in a combination of two or more types. Among these, the polyurethane resin, the acrylic resin, the cellulose resin, and the vinyl chloride resin are preferable.

In order to improve the dispersibility of the powders, the binder preferably has a functional group (polar group) that is adsorbed on the surface of the magnetic powder and the non-magnetic powder. Preferred examples of the functional group include —SO$_3$M, —SO$_4$M, —PO(OM)$_2$, —OPO(OM)$_2$, —COOM, >NSO$_3$M, >NRSO$_3$M, —NR$^1$R$^2$, and —N$^+$R$^1$R$^2$R$^3$X$^-$. M denotes a hydrogen atom or an alkali metal such as Na or K, R denotes an alkylene group, R$^1$, R$^2$, and R$^3$ denote alkyl groups, hydroxyalkyl groups, or hydrogen atoms, and X denotes a halogen such as Cl or Br. The amount of functional group in the binder is preferably 10 to 200 μeq/g, and more preferably 30 to 120 μeq/g. When it is in this range, good dispersibility can be achieved, which is preferable.

The binder preferably includes, in addition to the adsorbing functional group, a functional group having an active hydrogen, such as —OH, group in order to improve the coating strength by reacting with an isocyanate curing agent so as to form a crosslinked structure. A preferred amount is 0.1 to 2 meq/g.

The molecular weight of the binder is preferably 10,000 to 200,000 as a weight-average molecular weight, and more preferably 20,000 to 100,000. When it is in this range, sufficient coating strength can be obtained, and both the durability and the dispersibility are good, which is preferable.

The polyurethane resin, which is a preferred binder, is described in detail in, for example, 'Poriuretan Jushi Handobukku' (Polyurethane Resin Handbook) (Ed., K. Iwata, 1986, The Nikkan Kogyo Shimbun, Ltd.), and it is normally obtained by addition-polymerization of a long chain diol, a short chain diol (also known as a chain extending agent), and a diisocyanate compound. As the long chain diol, a polyester diol, a polyether diol, a polyetherester diol, a polycarbonate diol, a polyolefin diol, etc, having a molecular weight of 500 to 5,000 are used. Depending on the type of this long chain polyol, the polyurethanes are called polyester urethanes, polyether urethanes, polyetherester urethanes, polycarbonate urethanes, etc.

The polyester diol is obtained by a condensation-polymerization between a glycol and a dibasic aliphatic acid such as adipic acid, sebacic acid, or azelaic acid, or a dibasic aromatic acid such as isophthalic acid, orthophthalic acid, terephthalic acid, or naphthalenedicarboxylic acid,. Examples of the glycol component include ethylene glycol, 1,2-propylene glycol, 1,3-propanediol, 1,4-butanediol, 1,5-pentanediol, 3-methyl-1,5-pentanediol, 1,6-hexanediol, 2,2-dimethyl-1,3-propanediol, 1,8-octanediol, 1,9-nonanediol, cyclohexanediol, cyclohexane dimethanol, and hydrogenated bisphenol A. As the polyester diol, in addition to the above, a polycaprolactonediol or a polyvalerolactonediol obtained by ring-opening polymerization of a lactone such as ε-caprolactone or γ-valerolactone can be used.

From the viewpoint of resistance to hydrolysis, the polyester diol is preferably one having a branched side chain or one obtained from an aromatic or alicyclic starting material.

Examples of the polyether diol include polyethylene glycol, polypropylene glycol, polytetramethylene glycol, aromatic glycols such as bisphenol A, bisphenol S, bisphenol P, and hydrogenated bisphenol A, and addition-polymerization products from an alicyclic diol and an alkylene oxide such as ethylene oxide or propylene oxide.

These long chain diols can be used as a mixture of a plurality of types thereof.

The short chain diol can be chosen from the compound group that is cited as the glycol component of the above-mentioned polyester diol. Furthermore, a small amount of a tri- or higher-hydric alcohol such as, for example, trimethylolethane, trimethylolpropane, or pentaerythritol can be added, and this gives a polyurethane resin having a branched structure, thus reducing the solution viscosity and increasing the number of OH end groups of the polyurethane so as to improve the curing properties with the isocyanate curing agent.

Examples of the diisocyanate compound include aromatic diisocyanates such as MDI (diphenylmethane diisocyanate), 2,4-TDI (tolylene diisocyanate), 2,6-TDI, 1,5-NDI (naphthalene diisocyanate), TODI (tolidine diisocyanate), p-phenylene diisocyanate, and XDI (xylylene diisocyanate), and aliphatic and alicyclic diisocyanates such as trans-cyclohexane-1,4-diisocyanate, HDI (hexamethylene diisocyanate), IPDI (isophorone diisocyanate), $H_6$XDI (hydrogenated xylylene diisocyanate), and $H_{12}$MDI (hydrogenated diphenylmethane diisocyanate).

The long chain diol/short chain diol/diisocyanate ratio in the polyurethane resin is preferably (15 to 80 wt %)/(5 to 40 wt %)/(15 to 50 wt %).

The concentration of urethane groups in the polyurethane resin is preferably 1 to 5 meq/g, and more preferably 1.5 to 4.5 meq/g. When it is in this range, the mechanical strength is high, and since the solution viscosity is good high dispersibility can be obtained, which is preferable.

The glass transition temperature of the polyurethane resin is preferably 0 to 200° C., and more preferably 40 to 160° C. When it is in this range, the durability is excellent, the calender moldability is good, and good electromagnetic conversion characteristics can therefore be obtained, which is preferable.

With regard to a method for introducing the adsorbing functional group (polar group) into the polyurethane resin, there are, for example, a method in which the functional group is used in a part of the long chain diol monomer, a method in which it is used in a part of the short chain diol, and a method in which, after the polyurethane is formed by polymerization, the polar group is introduced by a polymer reaction.

As the vinyl chloride resin a copolymer of a vinyl chloride monomer and various types of monomer is used.

Examples of the comonomer include fatty acid vinyl esters such as vinyl acetate and vinyl propionate, acrylates and methacrylates such as methyl(meth)acrylate, ethyl (meth)acrylate, isopropyl (meth)acrylate, butyl(meth) acrylate, and benzyl(meth)acrylate, alkyl allyl ethers such as allyl methyl ether, allyl ethyl ether, allyl propyl ether, and allyl butyl ether, and others such as styrene, α-methylstyrene, vinylidene chloride, acrylonitrile, ethylene, butadiene, and acrylamide; examples of a comonomer having a functional group include vinyl alcohol, 2-hydroxyethyl(meth)acrylate, polyethylene glycol(meth) acrylate, 2-hydroxypropyl(meth)acrylate, 3-hydroxypropyl (meth)acrylate, polypropylene glycol(meth)acrylate, 2-hydroxyethyl allyl ether, 2-hydroxypropyl allyl ether, 3-hydroxypropyl allyl ether, p-vinylphenol, maleic acid, maleic anhydride, acrylic acid, methacrylic acid, glydicyl (meth)acrylate, allyl glycidyl ether, phosphoethyl (meth) acrylate, sulfoethyl(meth)acrylate, p-styrenesulfonic acid, and Na salts and K salts thereof.

The proportion of the vinyl chloride monomer in the vinyl chloride resin is preferably 60 to 95 wt %. When it is less than this range the mechanical strength deteriorates, and when it is too high the solvent solubility is degraded, the solution viscosity increases, and the dispersibility deteriorates.

A preferred amount of a functional group for improving the curing properties of the adsorbing functional group (polar group) and the polyisocyanate curing agent is as described above. With regard to a method for introducing this functional group, a monomer containing the above-mentioned functional group can be copolymerized, or after the vinyl chloride resin is formed by copolymerization, the functional group can be introduced by a polymer reaction.

A preferred degree of polymerization is 200 to 600, and more preferably 240 to 450. When it is in this range, the mechanical strength is high, the solution viscosity is good, and the dispersibility is high, which is preferable.

In order to crosslink and cure the binder used in the present invention so as to improve the mechanical strength and the thermal resistance of a coating, a curing agent can be used. Preferred examples of the curing agent include polyisocyanate compounds. It is preferable for the polyisocyanate compound to be a tri- or higher-functional polyisocyanate.

Specific examples thereof include adduct type polyisocyanate compounds such as a compound obtained by adding 3 mol of TDI (tolylene diisocyanate) to 1 mol of trimethylolpropane (TMP), a compound obtained by adding 3 mol of HDI (hexamethylene diisocyanate) to 1 mol of TMP, a compound obtained by adding 3 mol of IPDI (isophorone diisocyanate) to 1 mol of TMP, and a compound obtained by adding 3 mol of XDI (xylylene diisocyanate) to 1 mol of TMP; TDI condensation isocyanurate type trimer, TDI condensation isocyanurate type pentamer, TDI condensation isocyanurate type heptamer, mixtures thereof; an HDI isocyanurate type condensate, an IPDI isocyanurate type condensate; and crude MDI.

Among these, the compound obtained by adding 3 mol of TDI to 1 mol of TMP, TDI isocyanurate type trimer, etc. are preferable.

Other than the isocyanate curing agents, a curing agent that cures when exposed to an electron beam, ultraviolet rays, etc. can be used. In this case, it is possible to use a curing agent having, as radiation-curing functional groups, two or more, and preferably three or more, acryloyl or methacryloyl groups. Examples thereof include TMP (trimethylolpropane) triacrylate, pentaerythritol tetraacrylate, and a urethane acrylate oligomer. In this case, it is preferable to introduce a (meth)acryloyl group not only to the curing agent but also to the binder. In the case of curing with ultraviolet rays, a photosensitizer is additionally used.

It is preferable to add 0 to 80 parts by weight of the curing agent relative to 100 parts by weight of the binder. When too much is added, the dispersibility tends to deteriorate.

The amount of binder added to the magnetic layer is preferably 5 to 30 parts by weight relative to 100 parts by weight of the ferromagnetic powder, and more preferably 10 to 20 parts by weight.

The magnetic layer of the present invention can contain an additive as necessary. Examples of the additive include an abrasive, a lubricant, a dispersant/dispersion adjuvant, an anti-mold agent, an antistatic agent, an antioxidant, a solvent, and carbon black.

Examples of these additives are as follows.

Molybdenum disulfide, tungsten disulfide, graphite, boron nitride, graphite fluoride, a silicone oil, a polar group-containing silicone, a fatty acid-modified silicone, a fluorine-containing silicone, a fluorine-containing alcohol, a fluorine-containing ester, a polyolefin, a polyglycol, a polyphenyl ether, and aromatic ring-containing organic phosphonic acids such as phenylphosphonic acid, benzylphosphonic acid, phenethylphosphonic acid, α-methylbenzylphosphonic acid, 1-methyl-1-phenethylphosphonic acid, diphenylmethylphosphonic acid, biphenylphosphonic acid, benzylphenylphosphonic acid, α-cumylphosphonic acid, tolylphosphonic acid, xylylphosphonic acid, ethylphenylphosphonic acid, cumenylphosphonic acid, propylphenylphosphonic acid, butylphenylphosphonic acid, heptylphenylphosphonic acid, octylphenylphosphonic acid, nonylphenylphosphonic acid, and alkali metal salts thereof; alkylphosphonic acids such as octylphosphonic acid, 2-ethylhexylphosphonic acid, isooctylphosphonic acid, isononylphosphonic acid, isodecylphosphonic acid, isoundecylphosphonic acid, isododecylphosphonic acid, isohexadecylphosphonic acid, isooctadecylphosphonic acid, and isoeicosylphosphonic acid, and alkali metal salts thereof; aromatic phosphates such as phenyl phosphate, benzyl phosphate, phenethyl phosphate, α-methylbenzyl phosphate, 1-methyl-1-phenethyl phosphate, diphenylmethyl phosphate, biphenyl phosphate, benzylphenyl phosphate, α-cumyl phosphate, tolyl phosphate, xylyl phosphate, ethylphenyl phosphate, cumenyl phosphate, propylphenyl phosphate, butylphenyl phosphate, heptylphenyl phosphate, octylphenyl phosphate, and nonylphenyl phosphate, and alkali metal salts thereof; alkyl phosphates such as octyl phosphate, 2-ethylhexyl phosphate, isooctyl phosphate, isononyl phosphate, isodecyl phosphate, isoundecyl phosphate, isododecyl phosphate, isohexadecyl phosphate, isooctadecyl phosphate, and isoeicosyl phosphate, and alkali metal salts thereof; alkyl sulphonates and alkali metal salts thereof; fluorine-containing alkyl sulfates and alkali metal salts thereof; monobasic fatty acids that have 10 to 24 carbons, may contain an unsaturated bond, and may be branched, such as lauric acid, myristic acid, palmitic acid, stearic acid, behenic acid, butyl stearate, oleic acid, linoleic acid, linolenic acid, elaidic acid, or erucic acid, and metal salts thereof; mono-fatty acid esters, di-fatty acid esters, and poly-fatty acid esters such as butyl stearate, octyl stearate, amyl stearate, isooctyl stearate, octyl myristate, butyl laurate, butoxyethyl stearate, anhydrosorbitan monostearate, anhydrosorbitan distearate, and anhydrosorbitan tristearate that are formed from a monobasic fatty acid that has 10 to 24 carbons, may contain an unsaturated bond, and may be branched, and any one of a mono- to hexa-hydric alcohol that has 2 to 22 carbons, may contain an unsaturated bond, and may be branched, an alkoxy alcohol that has 12 to 22 carbons, may have an unsaturated bond, and may be branched, and a mono alkyl ether of an alkylene oxide polymer; fatty acid amides having 2 to 22 carbons; aliphatic amines having 8 to 22 carbons; etc. Other than the above-mentioned hydrocarbon groups, those having an alkyl, aryl, or aralkyl group that is substituted with a group other than a hydrocarbon group, such as a nitro group, F, Cl, Br, or a halogen-containing hydrocarbon such as $CF_3$, $CCl_3$, or $CBr_3$ can also be used.

Furthermore, there are a nonionic surfactant such as an alkylene oxide type, a glycerol type, a glycidol type, or an alkylphenol-ethylene oxide adduct; a cationic surfactant such as a cyclic amine, an ester amide, a quaternary ammonium salt, a hydantoin derivative, a heterocyclic compound, a phosphonium salt, or a sulfonium salt; an anionic surfactant containing an acidic group such as a carboxylic acid, a sulfonic acid, or a sulfate ester group; and an amphoteric surfactant such as an amino acid, an aminosulfonic acid, a sulfate ester or a phosphate ester of an amino alcohol, or an alkylbetaine. Details of these surfactants are described in 'Kaimenkasseizai Binran' (Surfactant Handbook) (published by Sangyo Tosho Publishing).

The dispersant, lubricant, etc. need not always be pure and may contain, in addition to the main component, an impurity such as an isomer, an unreacted material, a by-product, a decomposed product, or an oxide. However, the impurity content is preferably 30 wt % or less, and more preferably 10 wt % or less.

Specific examples of these additives include NAA-102, hardened castor oil fatty acids, NAA42, Cation SA, Nymeen L-201, Nonion E-208, Anon BF, and Anon LG, (produced by Nippon Oil & Fats Co., Ltd.); FAL-205, and FAL-123 (produced by Takemoto Oil & Fat Co., Ltd), Enujelv OL (produced by New Japan Chemical Co., Ltd.), TA-3 (produced by Shin-Etsu Chemical Industry Co., Ltd.), Armide P (produced by Lion Armour), Duomin TDO (produced by Lion Corporation), BA41G (produced by The Nisshin Oil Mills, Ltd.), Profan 2012E, Newpol PE 61, and Ionet MS400 (produced by Sanyo Chemical Industries, Ltd.).

An organic solvent used for the magnetic layer of the present invention can be a known organic solvent. As the organic solvent, a ketone such as acetone, methyl ethyl ketone, methyl isobutyl ketone, diisobutyl ketone, cyclohexanone, isophorone, or tetrahydrofuran, an alcohol such as methanol, ethanol, propanol, butanol, isobutyl alcohol, isopropyl alcohol, or methylcyclohexanol, an ester such as methyl acetate, butyl acetate, isobutyl acetate, isopropyl acetate, ethyl lactate, or glycol acetate, a glycol ether such as glycol dimethyl ether, glycol monoethyl ether, or dioxane, an aromatic hydrocarbon such as benzene, toluene, xylene, cresol, or chlorobenzene, a chlorohydrocarbon such as methylene chloride, ethylene chloride, carbon tetrachloride, chloroform, ethylene chlorohydrin, or dichlorobenzene, N,N-dimethylformamide, hexane, etc. can be used at any ratio.

These organic solvents do not always need to be 100% pure, and may contain an impurity such as an isomer, an unreacted compound, a by-product, a decomposed product, an oxide, or moisture in addition to the main component. The content of these impurities is preferably 30% or less, and more preferably 10% or less. The organic solvent used in the present invention is preferably the same type for both the magnetic layer and the non-magnetic layer. However, the amount added may be varied. The coating stability is improved by using a high surface tension solvent (cyclohexanone, dioxane, etc.) for the non-magnetic layer; more specifically, it is important that the arithmetic mean value of the surface tension of the magnetic layer solvent composition is not less than that for the surface tension of the non-magnetic layer solvent composition. In order to improve the dispersibility, it is preferable for the polarity to be somewhat strong, and the solvent composition preferably contains at least 50% of a solvent having a permittivity of 15 or higher. The solubility parameter is preferably 8 to 11.

The type and the amount of the dispersant, lubricant, and surfactant used in the magnetic layer of the present invention can be changed as necessary in the magnetic layer and the non-magnetic layer, which will be described later. For example, although not limited to only the examples illustrated here, the dispersant has the property of adsorbing or bonding via its polar group, and it is surmised that the dispersant adsorbs or bonds, via the polar group, to mainly the surface of the ferromagnetic powder in the magnetic layer and mainly the surface of the non-magnetic powder in the non-magnetic layer, which will be described later, and once adsorbed it is hard to desorb an organophosphorus compound from the surface of metal, a metal compound, etc. Therefore, since in the present invention the surface of the ferromagnetic powder or the surface of the non-magnetic powder, which will be described later, are in a state in which they are covered with an alkyl group, an aromatic group, etc., the affinity of the ferromagnetic powder or the non-magnetic powder toward the binder resin component increases and, furthermore, the dispersion stability of the ferromagnetic powder or the non-magnetic powder is also improved. With regard to the lubricant, since it is present in a free state, its exudation to the surface is controlled by using fatty acids having different melting points for the non-magnetic layer and the magnetic layer or by using esters having different boiling points or polarity. The coating stability can be improved by regulating the amount of surfactant added, and the lubrication effect can be improved by increasing the amount of lubricant added to the non-magnetic layer. All or a part of the additives used in the present invention may be added to magnetic layer or non-magnetic layer coating solutions at any stage of their preparation. For example, an additive may be blended with a ferromagnetic powder before a kneading step; it may be added during a kneading step involving the ferromagnetic powder, a binder, and a solvent; it may be added during a dispersing step; it may be added after the dispersing step; or it may be added immediately before coating.

The magnetic layer in the present invention can contain carbon black as necessary.

The carbon black used in the magnetic layer can be the same as that used in the radiation-cured layer. The carbon black may be used singly or in a combination. When carbon black is used, the amount thereof added is preferably 0.1 to 30 wt % relative to the magnetic substance. The carbon black has the functions of preventing static charging of the magnetic layer, reducing the coefficient of friction, imparting light-shielding properties, and improving the coating strength. Such functions vary depending upon the type of carbon black used. Accordingly, it is of course possible in the present invention to appropriately choose the type, the amount, and the combination of carbon black for the magnetic layer according to the intended purpose on the basis of the above-mentioned various properties such as the particle size, the oil absorption, the electrical conductivity and the pH value, but it is better if they are optimized for the respective layers.

III. Non-magnetic Layer

The magnetic recording medium of the present invention can include a non-magnetic layer above the non-magnetic support, the non-magnetic layer containing a binder and a non-magnetic powder. The non-magnetic powder that can be used in the non-magnetic layer can be an inorganic substance or an organic substance. The non-magnetic layer can further include carbon black as necessary together with the non-magnetic powder.

In general, the light transmittance of the non-magnetic layer of the present invention is preferably 3% or less for infrared rays having a wavelength of about 900 nm. The micro Vickers hardness is preferably 25 to 60 kg/mm$^2$ and, for adjusting the head contact, more preferably 30 to 50 kg/mm$^2$. It can be measured using a thin film hardness meter (HMA400 manufactured by NEC Corporation) with a four-sided pyramidal diamond probe having a tip angle of 80° and a tip radius of 0.1 µm.

The carbon black and the non-magnetic powder of the non-magnetic layer can be the same as those used for the radiation-cured layer. The carbon black can be used singly or in a combination. When carbon black is used, the amount thereof added is preferably 0.1 to 1,000 wt % relative to the non-magnetic powder. The carbon black has the functions of preventing static charging, reducing the coefficient of friction, imparting light-shielding properties, improving the coating strength, etc. of the non-magnetic layer, and these functions depend on the type of carbon black. Therefore, the type, the amount, and the combination of carbon black used in the present invention can of course be determined for the non-magnetic layer according to the intended purpose based on the above-mentioned various properties such as the particle size, the oil absorption, the electric conductivity, and the pH, but it is better if they are optimized for each layer.

As a binder resin, lubricant, dispersant, additive, solvent, dispersing method, etc. for the non-magnetic layer, those for the magnetic layer can be employed. In particular, the amount and the type of binder, and the amounts and types of additive and dispersant can be determined according to known techniques regarding the magnetic layer.

IV. Non-magnetic Support

With regard to the non-magnetic support that can be used in the present invention, known biaxially stretched films such as polyethylene terephthalate, polyethylene naphthalate, polyamide, polyamideimide, and aromatic polyamide can be used. Polyethylene terephthalate, polyethylene naphthalate, and polyamide are preferred.

These supports can be subjected in advance to a corona discharge treatment, a plasma treatment, a treatment for enhancing adhesion, a thermal treatment, etc. The non-magnetic support that can be used in the present invention preferably has a surface smoothness such that its center plane average surface roughness Ra is in the range of 3 to 10 nm for a cutoff value of 0.25 mm.

V. Backcoat Layer

In general, there is a strong requirement for magnetic tapes for recording computer data to have better repetitive transport properties than video tapes and audio tapes. In order to maintain such high storage stability, a backcoat layer can be provided on the surface of the non-magnetic support opposite to the surface where the non-magnetic layer and the magnetic layer are provided. As a coating solution for the backcoat layer, a binder and a particulate component such as an abrasive or an antistatic agent are dispersed in an organic solvent. As a particulate component, various types of inorganic pigment or carbon black can be used. As the binder, a resin such as nitrocellulose, a phenoxy resin, a vinyl chloride resin, or a polyurethane can be used singly or in combination.

VI. Undercoat Layer

In the magnetic recording medium of the present invention, an undercoat layer can be further provided on top of the non-magnetic support. Providing the undercoat layer enables the adhesion between the non-magnetic support and the radiation-cured layer to be improved. In the undercoat layer, a solvent-soluble polyester resin, polyurethane resin, polyamide resin, or polyamideimide resin, etc. can be used.

VII. Layer Structure

In the constitution of the magnetic recording medium used in the present invention, the thickness of the radiation-cured layer is preferably in the range of 0.1 to 1.0 μm as described above. The thickness of the non-magnetic support is preferably 3 to 80 μm. When the undercoat layer is provided between the non-magnetic support and the radiation-cured layer, the thickness of the undercoat layer is preferably 0.01 to 0.8 μm, and more preferably 0.02 to 0.6 μm. The thickness of the backcoat layer provided on the surface of the non-magnetic support opposite to the surface where the non-magnetic layer and the magnetic layer are provided is preferably 0.1 to 1.0 μm, and more preferably 0.2 to 0.8 μm.

The thickness of the magnetic layer is optimized according to the saturation magnetization and the head gap length of the magnetic head and the bandwidth of the recording signal but, in general, it is preferably 0.01 to 0.10 μm, more preferably 0.02 to 0.10 μm, and yet more preferably 0.03 to 0.10 μm. The percentage variation in thickness of the magnetic layer is preferably ±50% or less, and more preferably ±40% or less. The magnetic layer can be at least one layer, but it is also possible to provide two or more separate layers having different magnetic properties, and a known configuration for a multilayer magnetic layer can be employed.

The thickness of the non-magnetic layer of the present invention is preferably 0.2 to 3.0 μm, more preferably 0.3 to 2.5 μm, and yet more preferably 0.4 to 2.0 μm. The non-magnetic layer of the magnetic recording medium of the present invention can exhibit its effect if it is substantially non-magnetic, but even if a small amount of a magnetic substance is included as an impurity or intentionally, the effects of the present invention are exhibited, and this is considered to have substantially the same constitution as that of the magnetic recording medium of the present invention. The 'substantially the same' referred to here means that the residual magnetic flux density of the non-magnetic layer is 10 mT (100 G) or less or the coercive force thereof is 7.96 kA/m (100 Oe) or less, and that it preferably has no residual magnetic flux density or coercive force.

VIII. Production Method

A process for producing a magnetic layer coating solution for the magnetic recording medium used in the present invention comprises at least a kneading step, a dispersion step and, optionally, a blending step that is carried out prior to and/or subsequent to the above-mentioned steps. Each of these steps may be composed of two or more separate stages. All materials including the ferromagnetic hexagonal ferrite powder, the ferromagnetic metal powder, the non-magnetic powder, the binder, the carbon black, the abrasive, the antistatic agent, the lubricant, and the solvent used in the present invention may be added in any step from the beginning or during the course of the step. The addition of each material may be divided across two or more steps. For example, a polyurethane can be divided and added in a kneading step, a dispersing step, and a blending step for adjusting the viscosity after dispersion. To attain the object of the present invention, a conventionally known production technique may be employed as a part of the steps. In the kneading step, it is preferable to use a powerful kneading machine such as an open kneader, a continuous kneader, a pressure kneader, or an extruder. When such a kneader is used, all or a part of the binder (preferably 30 wt % or above of the entire binder) is preferably kneaded with the ferromagnetic powder or the non-magnetic powder. The proportion of the binder added is preferably 10 to 500 parts by weight relative to 100 parts by weight of the ferromagnetic powder or the non-magnetic powder. Details of these kneading treatments are described in JP-A-1-106338 and JP-A-1-79274. For the dispersion of the magnetic layer solution and a non-magnetic layer solution, glass beads can be used. As such glass beads, a dispersing medium having a high specific gravity such as zirconia beads, titania beads, or steel beads is suitably used. An optimal particle size and packing density of these dispersing media should be selected. A known dispersing machine can be used.

The process for producing the magnetic recording medium of the present invention includes, for example, coating the surface of a traveling non-magnetic support with a magnetic layer coating solution so as to give a predetermined coating thickness. A plurality of magnetic layer coating solutions can be applied successively or simultaneously, and in this case a lower magnetic layer coating solution and an upper magnetic layer coating solution can be applied successively or simultaneously. As coating equipment for applying the above-mentioned magnetic coating solution or the lower magnetic layer coating solution, an air doctor coater, a blade coater, a rod coater, an extrusion coater, an air knife coater, a squeegee coater, a dip coater, a reverse roll coater, a transfer roll coater, a gravure coater, a kiss coater, a cast coater, a spray coater, a spin coater, etc. can be used. With regard to these, for example, 'Saishin Kotingu Gijutsu' (Latest Coating Technology) (May 31, 1983) published by Sogo Gijutsu Center can be referred to.

In the case of a magnetic tape, the coated layer of the magnetic layer coating solution is subjected to a magnetic alignment treatment in which the ferromagnetic powder contained in the coated layer of the magnetic layer coating solution is aligned in the longitudinal direction using a cobalt magnet or a solenoid. In the case of a disk, although sufficient isotropic alignment can sometimes be obtained without using an alignment device, it is preferable to employ a known random alignment device such as, for example, arranging obliquely alternating cobalt magnets or applying an alternating magnetic field with a solenoid. The isotropic alignment referred to here means that, in the case of a ferromagnetic metal powder, in general, in-plane two-dimensional random is preferable, but it can be three-dimensional random by introducing a vertical component. In the case of a ferromagnetic hexagonal ferrite powder, in general, it tends to be in-plane and vertical three-dimensional random, but in-plane two-dimensional random is also possible. By using a known method such as magnets having different poles facing each other so as to make vertical alignment, circumferentially isotropic magnetic properties can be introduced. In particular, when carrying out high density recording, vertical alignment is preferable. Furthermore, circumferential alignment may be employed using spin coating.

It is preferable for the drying position for the coating to be controlled by controlling the drying temperature and blowing rate and the coating speed; it is preferable for the coating speed to be 20 to 1,000 m/min and the temperature of drying air to be at least 60° C., and an appropriate level of pre-drying may be carried out prior to entering a magnet zone.

After drying is carried out, the coated layer is subjected to a surface smoothing treatment. The surface smoothing treatment employs, for example, super calender rolls, etc. By carrying out the surface smoothing treatment, cavities formed by removal of the solvent during drying are eliminated, thereby increasing the packing ratio of the ferromagnetic powder in the magnetic layer, and a magnetic recording medium having high electromagnetic conversion characteristics can thus be obtained.

With regard to calendering rolls, rolls of a heat-resistant plastic such as epoxy, polyimide, polyamide, or polyamide-imide are used. It is also possible to treat with metal rolls. The magnetic recording medium of the present invention preferably has a center plane average surface roughness in the range of 0.1 to 4.0 nm for a cutoff value of 0.25 mm, and more preferably 0.5 to 3.0 nm, which is extremely smooth. As a method therefor, a magnetic layer formed by selecting a specific ferromagnetic powder and binder as described above is subjected to the above-mentioned calendering treatment. The calender roll temperature is preferably in the range of 60 to 100° C., more preferably in the range of 70 to 100° C., and particularly preferably in the range of 80 to 100° C., and the pressure is preferably in the range of 100 to 500 kg/cm, more preferably in the range of 200 to 450 kg/cm, and particularly preferably in the range of 300 to 400 kg/cm. The calendering is preferably carried out by operation at a temperature and pressure in the above-mentioned ranges.

As thermal shrinkage reducing means, there is a method in which a web is thermally treated while handling it with low tension, and a method (thermal treatment) involving thermal treatment of a tape when it is in a layered configuration such as in bulk or installed in a cassette, and either can be used. In the former method, the effect of the imprint of projections of the surface of the backcoat layer is small, but the thermal shrinkage cannot be greatly reduced. On the other hand, the latter thermal treatment can improve the thermal shrinkage greatly, but if the effect of the imprint of projections of the surface of the backcoat layer is strong, the surface of the magnetic layer roughens, and there is a possibility that this will cause the output to decrease and the noise to increase. In particular, a high output and low noise magnetic recording medium can be provided for the magnetic recording medium accompanying the thermal treatment. The magnetic recording medium thus obtained can be cut to a desired size using a cutter, a stamper, etc. before use.

IX. Physical Properties

The saturation magnetic flux density of the magnetic layer of the magnetic recording medium used in the present invention is preferably 100 to 300 mT (1,000 to 3,000 G). The coercive force (Hc) of the magnetic layer is preferably 143 to 318 kA/m (1,800 to 4,000 Oe), and more preferably 159 to 279 kA/m (2,000 to 3,500 Oe). It is preferable for the distribution of the coercive force to be narrow, and the SFD and SFDr are preferably 0.6 or less, and more preferably 0.2 or less.

The coefficient of friction, with respect to the head, of the magnetic recording medium used in the present invention is preferably 0.5 or less at a temperature of −10° C. to 40° C. and a humidity of 0 to 95%, and preferably 0.4 or less. The electrostatic potential is preferably −500 to +500 V. The modulus of elasticity of the magnetic layer at an elongation of 0.5% is preferably 0.98 to 19.6 GPa (100 to 2,000 kg/mm$^2$) in each direction within the plane, the breaking strength is preferably 98 to 686 MPa (10 to 70 kg/mm$^2$); the modulus of elasticity of the magnetic recording medium is preferably 0.98 to 14.7 GPa (100 to 1,500 kg/mm$^2$) in each direction within the plane, the residual elongation is preferably 0.5% or less, and the thermal shrinkage at any temperature up to and including 100° C. is preferably 1% or less, more preferably 0.5% or less, and yet more preferably 0.1% or less.

The glass transition temperature of the magnetic layer (the maximum point of the loss modulus in a dynamic viscoelasticity measurement measured at 110 Hz) is preferably 50 to 180° C., and that of the non-magnetic layer is preferably 0 to 180° C. The loss modulus is preferably in the range of $1 \times 10^7$ to $8 \times 10^8$ Pa ($1 \times 10^8$ to $8 \times 10^9$ dyne/cm$^2$), and the loss tangent is preferably 0.2 or less. When the loss tangent is too large, the problem of tackiness easily occurs. These thermal properties and mechanical properties are preferably substantially identical to within 10% in each direction in the plane of the medium.

The residual solvent in the magnetic layer is preferably 100 mg/m$^2$ or less, and more preferably 10 mg/m$^2$ or less. The porosity of the coating layer is preferably 30 vol % or less for both the non-magnetic layer and the magnetic layer, and more preferably 20 vol % or less. In order to achieve a high output, the porosity is preferably small, but there are cases in which a certain value should be maintained depending on the intended purpose. For example, in the case of disk media where repetitive use is considered to be important, a large porosity is often preferable from the point of view of storage stability.

The center plane average surface roughness Ra of the magnetic layer is preferably 4.0 nm or less, more preferably 3.0 nm or less, and yet more preferably 2.0 nm or less, when measured by the mirau method using a TOPO-3D. The maximum height $SR_{max}$ of the magnetic layer is preferably 0.5 μm or less, the ten-point average roughness SRz is 0.3 μm or less, the center plane peak height SRp is 0.3 μm or less, the center plane valley depth SRv is 0.3 μm or less, the center plane area factor SSr is 20 to 80%, and the average wavelength SλA is 5 to 300 μm. It is possible to set the number of surface projections on the magnetic layer having a size of 0.01 to 1 μm at any level in the range of 0 to 2,000 projections per (0.1 mm)$^2$, and by so doing the electromagnetic conversion characteristics and the coefficient of friction can be optimized, which is preferable. They can be controlled easily by controlling the surface properties of the support by means of a filler, the particle size and the amount of a powder added to the magnetic layer, and the shape of the roll surface in the calendering process. The curl is preferably within ±3 mm.

When the magnetic recording medium has a non-magnetic layer and a magnetic layer, it can easily be anticipated that the physical properties of the non-magnetic layer and the magnetic layer can be varied according to the intended purpose. For example, the elastic modulus of the magnetic layer can be made high, thereby improving the storage stability, and at the same time the elastic modulus of the non-magnetic layer can be made lower than that of the magnetic layer, thereby improving contact of the magnetic recording medium with a head.

A head used for playback of signals recorded magnetically on the magnetic recording medium of the present invention is not particularly limited, but an MR head is preferably used. When an MR head is used for playback of the magnetic recording medium of the present invention, the MR head is not particularly limited and, for example, a GMR head or a TMR head can be used. A head used for magnetic recording is not particularly limited, but it is preferable for the saturation magnetization to be 1.0 T or more, and preferably 1.5 T or more.

In accordance with the present invention, a magnetic recording medium can be obtained that has excellent smoothness and electromagnetic conversion characteristics, has few faults when transporting a web during a production process and little loss of the magnetic layer, and has excellent productivity.

EXAMPLES

The present invention is explained specifically below with reference to examples. The components, proportions, operations, sequences, etc. described here can be changed as long as they do not depart from the sprit and scope of the present invention, and should not be limited to the Examples below. 'Parts' in the Examples denotes 'parts by weight'.

Example 1
Preparation of Magnetic Coating Solution 100 parts of a ferromagnetic alloy powder (composition: Fe 89 atm %, Co 5 atm %, Y 6 atm %, Hc 151 kA/m (1,900 Oe), crystallite size 15 nm, $S_{BET}$ 60 m$^2$/g, major axis length 0.08 μm, acicular ratio 7, σs 150 A·m$^2$/kg (emu/g)) was ground in an open kneader for 10 minutes, subsequently 10 parts of a vinyl chloride resin (MR110, degree of polymerization 300, manufactured by Nippon Zeon Corporation), and 50 parts of a polyester polyurethane solution (SO$_3$Na content 100 μeq/g, weight-average molecular weight 40,000, glass transition temperature 70° C., 30% cyclohexanone solution) were added thereto, and the mixture was kneaded for 60 minutes.

Subsequently,

| | |
|---|---|
| an abrasive (Al$_2$O$_3$ particle size 0.3 μm) | 2 parts, |
| carbon black (particle size 40 nm) | 2 parts, and |
| methyl ethyl ketone/toluene = 1/1 | 200 parts | were added thereto, and the mixture was dispersed in a sand mill for 120 minutes,

| | |
|---|---|
| butyl stearate | 2 parts, |
| stearic acid | 1 part, and |
| methyl ethyl ketone | 50 parts | were further added thereto, the mixture was stirred and mixed for a further 20 minutes, and filtered using a filter having an average pore size of 1 μm to give a magnetic coating solution.

Preparation of Non-magnetic Coating Solution 100 parts of α-Fe$_2$O$_3$ (average particle size 0.15 μm, $S_{BET}$ 52 m$^2$/g, surface-treated with Al$_2$O$_3$ and SiO$_2$, pH 6.5 to 8.0) was ground in an open kneader for 10 minutes, subsequently 10 parts of a vinyl chloride resin MR110 (degree of polymerization 300) manufactured by Nippon Zeon Corporation, and 50 parts of a polyester polyurethane solution (SO$_3$Na content 100 μeq/g, weight-average molecular weight 40,000, Tg 70° C., 30% cyclohexanone solution) were added thereto, and the mixture was kneaded for 60 minutes.

Subsequently,

| | |
|---|---|
| methyl ethyl ketone/cyclohexanone = 6/4 | 200 parts | was added thereto, and the mixture was dispersed in a sand mill for 120 minutes. To this mixture,

| | |
|---|---|
| butyl stearate | 2 parts, |
| stearic acid | 1 part, and |
| methyl ethyl ketone | 50 parts | were added and the mixture was stirred and mixed for a further 20 minutes, and filtered using a filter having an average pore size of 1 μm to give a non-magnetic layer coating solution.

Preparation of Radiation Curing Coating Solution 100 parts of α-Fe$_2$O$_3$ (average particle size 0.15 μm, $S_{BET}$ 52 m$^2$/g, surface-treated with Al$_2$O$_3$ and SiO$_2$, pH 6.5 to 8.0) was ground in an open kneader for 10 minutes, subsequently 50 parts of a polyester polyurethane solution (SO$_3$Na content 100 μeq/g, weight-average molecular weight 40,000, Tg 70° C., 30% cyclohexanone solution) was added thereto, and the mixture was kneaded for 60 minutes. Subsequently, 200 parts of methyl ethyl ketone/cyclohexanone=6/4 was added thereto, and the mixture was dispersed in a sand mill for 120 minutes. This dispersion was called Dispersion A.

Subsequently, to this Dispersion A, a radiation curing compound and a solvent shown in Table 1 were added in the amounts shown in Table 1, the mixture was stirred and mixed for a further 20 minutes, and filtered using a filter having an average pore size of 1 μm to give a radiation curing coating solution.

The surface of a polyethylene terephthalate support having a thickness of 7 μm and a center plane average surface roughness Ra of 6.2 nm was coated with the coating solution using a coiled bar so that the dry thickness thereof was 0.5 μm, dried, and cured by irradiating the coating surface with an electron beam at an acceleration voltage of 100 kV and an absorbed dose of 1 Mrad so as to form a radiation-cured layer.

Immediately after that, the top of the radiation-cured layer was coated with the non-magnetic coating solution, on top of which was further applied the magnetic coating solution by simultaneous reverse roll multilayer coating so that the dry thicknesses thereof were 1.5 μm and 0.1 μm respectively. Before the magnetic coating solution had dried, it was subjected to magnetic field alignment using a 5,000 G Co magnet and a 4,000 G solenoid magnet, and after the solvent was removed by drying, it was subjected to a calender treatment employing a metal roll-metal roll-metal roll-metal roll-metal roll-metal roll-metal roll combination (speed 100 m/min, line pressure 300 kg/cm, temperature 90° C.) and then slit to a width of 3.8 mm to give a magnetic tape.

Examples 2 to 4 and Comparative Examples 1 and 2

The procedure of Example 1 was repeated except that the type and the amount of radiation curing compound added, the amount of Dispersion A added, and the amount of solvent added were changed as shown in Table 1, and magnetic tapes of Examples 2 to 4 and Comparative Examples 1 and 2 were obtained.

Comparative Example 3

The procedure of Example 1 was repeated except that the radiation-cured layer was not provided, and a magnetic tape of Comparative Example 3 was obtained.

Example 5 and Comparative Example 4

The procedures of Example 3 and Comparative Example 3 were repeated except that the magnetic substance (ferromagnetic alloy powder 100 parts) was changed to 100 parts of a ferromagnetic tabular hexagonal ferrite powder (composition (molar ratio): Ba/Fe/Co/Zn=1/9/0.1/1; Hc: 159 kA/m (2,000 Oe); plate size: 25 nm, tabular ratio: 3; $S_{BET}$: 80 m$^2$/g; σs: 50 A·m$^2$/kg (emu/g)), and magnetic tapes of Example 5 and Comparative Example 4 were obtained.

Measurement Methods sliding speed of 10 cm/sec. The measurement was carried out at 23° C. and 50% RH.

For Comparative Examples 3 and 4, the coefficient of friction of the non-magnetic support itself was measured.

(5) Occurrence of scratches on the Surface of the Radiation-cured Layer Within Coater When a 3,000 m length was coated, the surface of the radiation-cured layer was examined for scratches.

The measurement results are given in Table 1.

TABLE 1

| | Radiation-cured layer (parts by weight) | | | | Thickness of non-magnetic layer (μm) | Surface roughness of radiation-cured layer Ra (nm) | Surface roughness of magnetic layer Ra (nm) | Electro-magnetic conversion characteristics dB | Coefficient of friction of radiation-cured layer | Occurrence of scratches from path roller in coater |
|---|---|---|---|---|---|---|---|---|---|---|
| | Radiation curing compound | Dispersion A | | | | | | | | |
| | | | α-Iron | | | | | | | |
| | Amount added | Amount added | oxide content | Solvent | | | | | | |
| Example 1 | 3PGA | 70 | 105 | 30 | 175.0 | 1.5 | 2.3 | 2.6 | 0.6 | 0.31 | No |
| Example 2 | 3PGA | 97 | 10.5 | 3 | 377.5 | 1.5 | 1.7 | 2.5 | 0.9 | 0.35 | No |
| Example 3 | 3PGA | 99.7 | 1.05 | 0.3 | 397.8 | 1.5 | 1.6 | 2.3 | 1.1 | 0.41 | No |
| Comp. Ex. 1 | 3PGA | 100 | 0 | 0 | 400.0 | 1.5 | 1.6 | 2.4 | 1.1 | 0.67 | Yes |
| Comp. Ex. 2 | 3PGA | 60 | 140 | 40 | 100.0 | 1.5 | 3.2 | 3.2 | −2.0 | 0.31 | No |
| Example 4 | DCPA | 95 | 10.5 | 3 | 369.5 | 1.5 | 1.6 | 1.9 | 1.7 | 0.36 | No |
| Comp. Ex. 3 | — | — | — | — | — | 1.5 | — | 3.4 | 0.0 | (0.32)* | No |
| Example 5 | 3PGA | 99.7 | 1.05 | 0.3 | 397.8 | 1.5 | 1.6 | 2.1 | 1.2 | 0.41 | No |
| Comp. Ex. 4 | — | — | — | — | — | 1.5 | — | 3.3 | 0.0 | (0.32)* | No |

3PGA: Tripropylene glycol diacrylate (viscosity at 25° C.: 13 mPa · sec)
DCPA: Dimethyloltricyclodecane diacrylate (viscosity at 25° C.: 117 mPa · sec)

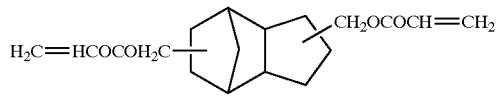

*For Comp. Ex. 3 and Comp. Ex. 4, coefficient of friction of non-magnetic support (1) Center Plane Average Surface Roughness Ra of Radiation-cured Layer A radiation curing layer was applied and irradiated with an electron beam, a sample was made without forming a non-magnetic layer and a magneticlayer, and the surface thereof was examined by an optical interference method using a digital optical profiler (manufactured by WYKO) and the center plane average surface roughness with a cutoff value of 0.25 mm was defined as Ra.

(2) Magnetic Layer Surface Roughness

The center plane average surface roughness Ra of a tape sample was measured by the same method as in (1).

(3) Electromagnetic Conversion Characteristics

A single frequency signal at 4.7 MHz was recorded using a DDS4 drive at an optimum recording current, and its playback output was measured. The playback output for Examples 1 to 4 and Comparative Examples 1 and 2 was expressed as a relative value where the playback output of Comparative Example 3 was 0 dB. The playback output for Example 5 was expressed as a relative value where the playback output of Comparative Example 4 was 0 dB.

(4) Coefficient of Friction of Radiation-cured Layer

After radiation curing, a sample was slit without applying a non-magnetic coating solution and a magnetic coating solution, and the coefficient of friction was measured by sliding the surface of the radiation-cured layer against a 5 mmφ SUS420J rod at a contact angle of 180 degrees and a

What is claimed is:

1. A magnetic recording medium comprising, in order:
a radiation-cured layer formed by applying a layer comprsing a radiation curing compound and curing by exposure to radiation,
a non-magnetic layer having a non-magnetic powder dispersed in a binder, and
a magnetic layer having a ferromagnetic powder dispersed in a binder;
the radiation-cured layer including 0.3 to 30 parts by weight of an inorganic powder relative to 100 parts by weight of the radiation curing compound, and
the inorganic powder being selected from the group consisting of a metal oxide, a metal carbonate, a metal sulfate, a metal nitride, a metal carbide, a metal silicide, and a metal sulfide.

2. The magnetic recording medium according to claim 1, wherein the inorganic powder is selected from the group consisting of α-alumina with an α component proportion of at least 90%, β-alumina, γ-alumina, θ-alumina, silicon carbide, chromium oxide, cerium oxide, α-iron oxide, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide.

3. The magnetic recording medium according to claim 1, wherein the inorganic powder is selected from the group consisting of titanium dioxide, zinc oxide, iron oxide, and barium sulfate.

4. The magnetic recording medium according to claim 1, wherein the inorganic powder is selected from the group consisting of titanium dioxide and α-iron oxide.

5. The magnetic recording medium according to claim 1, wherein the inorganic powder has the same composition as that of the non-magnetic powder.

6. The magnetic recording medium according to claim 1, wherein the radiation is an electron beam or ultraviolet rays.

7. The magnetic recording medium according to claim 1, wherein the radiation is an electron beam.

8. The magnetic recording medium according to claim 1, wherein the radiation curing compound is a disfunctional acrylate compound or a disfunctional methacrylate compound.

9. The magnetic recording medium according to claim 1, wherein the ferromagnetic powder is a ferromagnetic metal powder.

10. The magnetic recording medium according to claim 1, wherein the ferromagnetic powder is a ferromagnetic hexagonal ferrite powder.

11. The magnetic recording medium according to claim 1, wherein the radiation curing compound has a viscosity at 25° C. of 10 to 1,000 mPa·sec.

12. The magnetic recording medium according to claim 1, wherein the non-magnetic support has a thickness of 10 $\mu$m or less.

13. The magnetic recording medium according to claim 1, wherein the radiation-cured layer includes at least 0.3 parts by weight and less than 5 parts by weight of the inorganic powder relative to 100 parts by weight of the radiation curing compound.

* * * * *